United States Patent
Jain et al.

(10) Patent No.: US 6,510,276 B1
(45) Date of Patent: *Jan. 21, 2003

(54) HIGHLY DOPED FIBER LASERS AND AMPLIFIERS

(75) Inventors: Ravinder Jain, Albuquerque, NM (US); Balaji Srinivasan, Albuguerque, NM (US); Erik Poppe, Trondheim (NO)

(73) Assignee: Science & Technology Corporation @ UNM, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/302,839

(22) Filed: Apr. 30, 1999

Related U.S. Application Data

(60) Provisional application No. 60/083,772, filed on May 1, 1998.

(51) Int. Cl.$^7$ .......................... G02B 6/16; H01S 3/067; H01S 3/14
(52) U.S. Cl. .......................... 385/142; 385/123; 372/6; 359/341.1; 359/342
(58) Field of Search .......................... 359/333, 341–343; 372/6; 385/123, 141, 142

(56) References Cited

U.S. PATENT DOCUMENTS

| | | | |
|---|---|---|---|
| 5,084,890 A | 1/1992 | Brierley | 372/40 |
| 5,225,925 A | 7/1993 | Grubb et al. | 359/341 |
| 5,289,481 A | 2/1994 | Xie et al. | 372/39 |
| 5,313,477 A | 5/1994 | Esterowitz et al. | 372/6 |
| 5,388,110 A | 2/1995 | Snitzer | 372/6 |
| 5,530,709 A | 6/1996 | Waarts et al. | 372/6 |
| 5,623,510 A | 4/1997 | Hamilton et al. | 372/75 |
| 5,677,920 A | 10/1997 | Waarts et al. | 372/6 |
| 5,727,007 A | 3/1998 | Smart et al. | 372/6 |
| 6,061,170 A * | 5/2000 | Rice et al. | 359/341 |
| 6,154,598 A * | 11/2000 | Gavrilovic et al. | 385/141 |
| 6,205,281 B1 * | 3/2001 | Bange et al. | 385/142 |
| 6,360,040 B1 * | 3/2002 | Srinivasan et al. | 385/33 |

OTHER PUBLICATIONS

Wagener et al, "Effects of Concentration and Clusters in Erbium–Doped Fiber Lasers", Optics Letters, vol. 18, No. 23, Dec. 1, 1993, pp. 2014–2016.*

Davis et al, "Characterization of Clusters in Rare Earth–Doped Fibers by Transmission Measurements", Journal of Lightwave Technology, vol. 13, No. 2, Feb. 1995, pp. 120–126.*

Myslinski et al, "Effects of Concentration on the Performance of Erbium–Doped Fiber Amplifiers", Journal of Lightwave Technology, vol. 15, No. 1, Jan. 1997, pp. 112–120.*

Pollnau, "The Route Toward a Diode–Pumped 1–W Erbium 3–$\mu$m Fiber Laser," IEEE Journal of Quantum Electronic. vol. 33, No. 11, Nov. 1997, pp. 1982–1990.

Kintz et al, "cw and pulsed 2.8 $\mu$m laser emission from diode–pumped Er: YLF at room temperature," appl. Phys. Lett. 50 (22), Jun. 1, 1987, pp. 1553–1555.

Pollnau et al, "150 mW unsaturated output power at 3–$\mu$m from a single–mode–fiber erbium cascade laser," Appl. Phys. Lett. vol. 66, No. 26, Jun. 26, 1995, pp. 3564–3566.

Bedö et al., "Limits of the output power in $Er^{3+}$ ZBLAN singlemode fibre lasers," Electronic Letters, Feb. 2, 1995, vol. 31, No. 3, pp. 199–200.

* cited by examiner

Primary Examiner—John D. Lee
(74) Attorney, Agent, or Firm—Jagtiani + Guttag

(57) ABSTRACT

An improved highly doped waveguide is provided which comprises a waveguide having a dopant disposed therein, the dopant having a concentration of between 100 and 500,000 ppm, and wherein the concentration of the dopant enhances cross-relaxation between two elements of the dopant.

80 Claims, 4 Drawing Sheets

HIGHLY DOPED FIBER LASERS AND AMPLIFIERS

CROSS-REFERENCE TO RELATED APPLICATIONS

This application refers to the following co-pending U.S. Patent Applications. The first application is U.S. Prov. App. No. 60/083,772, entitled "Method for Enhancing Efficiency of Lasing at 2.7 μm in Erbium:ZBLAN Fiber Lasers and Amplifiers," filed May 1, 1998. This provisional application is hereby incorporated by reference, and priority under 35 U.S.C. §119(e)(1) is hereby claimed therefrom.

This invention is made with government support under grant number F49620-96-1-0079, awarded by the Air Force Office of Scientific Research. The government may have certain rights in this invention.

BACKGROUND OF THE INVENTION

1. Field of the Invention

The present invention relates generally to waveguide lasers and amplifiers based on low phonon energy glasses or crystals doped with external or impurity atoms or ions, and more particularly to devices using waveguides based on such glasses that incorporate high concentration of atoms or ions.

2. Description of the Prior Art

Because of the strong water absorption near 3 μm in tissue and the consequent ultrashort penetration depths (of a few microns), compact high power (100 mW to 1 W) 2.7 μm laser sources with $TEM_{00}$ beam quality have several important applications in ultrafine intra-ocular and endoscopic laser surgery including transmyocardial revascularization and other intra-arterial procedures. In such applications, laser energy absorbed by the targeted tissue is capable of its coagulation or precise ablation with minimal damage to the remaining tissue. Other applications that could benefit from compact and efficient sources of mid-IR radiation include infrared countermeasures and spectroscopic sensing.

A broadly tunable 2.7 μm transition in Er:ZBLAN appears particularly attractive for the design of compact, high power CW fiber lasers of excellent beam quality, as needed for the above-identified applications ranging from endoscopic laser surgery to countermeasures and spectroscopic monitoring. It is well known that the longer lifetime of the lower laser level ($^4I_{13/2}$, 9.4 ms) compared to the upper laser level ($^4I_{11/2}$, 7.5 ms) of this transition poses a serious bottleneck in such Er:ZBLAN lasers. This bottleneck has been alleviated by complex mechanisms such as: (1) selective depletion of the lower laser level via excited state absorption (ESA), and (2) cascade lasing. None of these solutions offer a commercially viable Er:ZBLAN laser.

SUMMARY OF THE INVENTION

It is therefore an object of the present invention to provide an improved highly doped fiber laser and/or amplifier that will provide high efficiency and high power output.

It is a further object to provide a highly doped fiber laser and/or amplifier which greatly reduces or eliminates the bottleneck associated with the longer lifetime of the lower laser level $^4I_{13/2}$ if Er is used as a dopant.

It is yet another object to provide a fiber laser and/or amplifier that has a dopant at a concentration level that results in clusters of such dopants.

It is yet another object to provide highly doped fiber laser and/or amplifier having a dopant that greatly enhances cross-relaxation.

It is yet another object to provide highly doped fiber laser and/or amplifier having a dopant that greatly enhances cross-relaxation by creating ion or dopant clusters.

It is yet another object to provide sensitizer ions or atoms to assist in the depopulation of lower energy levels through the energy transfer process.

In all of the above embodiments, it is an object to provide a highly doped fiber laser and/or amplifier that has a dopant concentrations between 1,001 and 149,999 ppm.

According to one broad aspect of the present invention, there is provided a highly doped waveguide comprising: a waveguide having a dopant disposed therein, the dopant having a concentration of between 1,001 and 500,000 ppm; and wherein the concentration of the dopant enhances cross-relaxation between two elements of the dopant.

According to another broad aspect of the invention, there is provided a highly doped waveguide comprising: a waveguide having a dopant disposed therein, the dopant having a concentration of between 1,001 and 500,000 ppm, the dopant being Er; wherein the waveguide is composed of material selected from the group comprising: GaN, ZnS, AlAs, GaAs, ZnSe, YLF, BaYF, $ZrF_4$, $HfF_4$, $BaF_2$, $SrF_2$, $LaF_3$, $YF_3$, $AlF_3$, KF, NaF, LiF, chalcogenides, tellurides, silicates, and chelates; and wherein the concentrations of the dopant enhances cross-relaxation between two elements of the dopant.

According to another broad aspect of the invention, there is provided A highly doped waveguide laser comprising: a low phonon energy waveguide having a dopant disposed therein, the dopant having a concentration of between 1,001 and 500,000 ppm, the dopant being Er; a resonant cavity, the resonant cavity being defined by a first and second reflective means at an amplification wavelength and disposed at opposite ends of the waveguide; an energy source for injecting energy into the waveguide; and wherein the concentrations of the dopant enhances cross-relaxation between two elements of the dopant.

According to another broad aspect of the invention, there is provided a highly doped waveguide amplifier comprising: a low phonon energy waveguide having a dopant disposed therein, the dopant having a concentration of between 1,001 and 500,000 ppm, the dopant being Er; an energy source for injecting energy into the waveguide and thereby forming a highly doped waveguide amplifier; and wherein the dopant enhances cross-relaxation between two elements of the dopant.

According to another broad aspect of the invention, there is provided a highly doped optical material comprising: a low phonon energy bulk material having a dopant disposed therein, the dopant having a concentration of between 100 and 150,000 ppm, the waveguide containing clusters of the dopant; and wherein the clusters enhance cross-relaxation between two elements of the dopant.

According to another broad aspect of the invention, there is provided a highly doped bulk material laser comprising: a low phonon energy bulk material having a dopant disposed therein, the dopant having a concentration of between 100 and 150,000 ppm, the bulk material containing clusters of the dopant; the dopant being Er; a resonant cavity, the resonant cavity being defined by a first and second reflective means at an amplification wavelength and disposed at two ends of the bulk material; an energy source for injecting energy into the bulk material; and wherein the dopant enhances cross-relaxation between two elements of the dopant.

According to another broad aspect of the invention, there is provided a highly doped bulk material amplifier comprising: a low phonon energy bulk material having a dopant disposed therein, the dopant having a concentration of between 100 and 150,000 ppm, the dopant being Er; an energy source for injecting energy into the bulk material and thereby forming a highly doped bulk material amplifier; and wherein the dopant enhances cross-relaxation between two elements of the dopant.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

Figure 1:
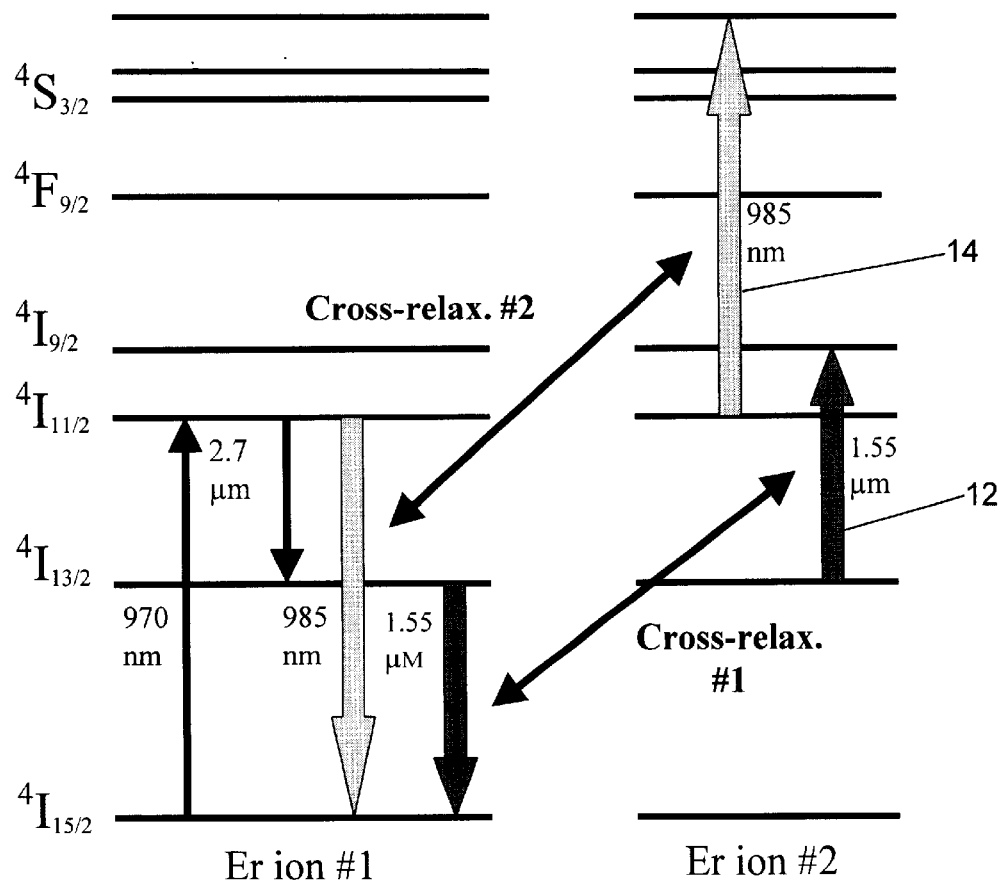
FIG. 1 is an energy level diagram showing the cross-relaxation process between two Er ions which is utilized with a preferred embodiment of the invention.

Before a substantive discussion of the preferred embodiment may begin, it is essential to define several key terms.

The term "waveguide" is used in this application to mean any low phonon energy material used to channel an optical signal, at any frequency. Specific examples of waveguides include, but are not limited to: fiber-optic waveguides; planar glass; crystalline and semiconductor waveguides. Examples of preferred materials for semiconductor waveguides include, but are not limited to: GaN, GaAs, ZnS, and ZnSc. It should be appreciated that semiconductor waveguides may be driven by electrical means which is considered an equivalent to the optical sources discussed below.

The term "bulk material" is used in this application to mean any low phonon energy material that may have an electrical or optical signal inserted therein. Specific examples of bulk materials include, but are not limited to: bulk glasses such as chalcogenides, tellurides, fluorides, silicates, and chelates; as well as crystals such as YLF, PaYF, $BAY_2F_8$; as well as semiconductors such as, but not limited to GaN, ZnS, ZnSe, GaAs, and AlAs.

The term "fiber optic cable" or "fiber optic waveguide" is used in this application to mean any waveguide utilized to guide light waves from one point to another. This definition specifically includes both single mode and multi-mode fibers as well as any waveguide having any cross-sectional shape or any single or multi-clad geometry. In addition, this term also includes any waveguide whether doped or undoped.

The term "Bragg grating" is used in this application to mean a structure containing alternating periodic segments of varying periods of high and low refractive index material segments and/or appropriately embedded phase shift segments at well defined locations of the structure. A period is defined as one set of adjacent high and low refractive material segments. It is understood by this definition that the order of the high and low index materials is irrelevant, only that there is a change in refractive index between adjacent segments. While only uniform gratings are illustrated, non-uniform gratings are also contemplated within the scope of the invention.

The term "dopant" is used in the present invention to mean any extraneous element or combination thereof which is added to a material to enhance or suppress a characteristic of that material. Examples of dopants include, but are not limited to: germanium (Ge), hydrogen (H), holmium (Ho), sodium (Na), lithium (Li), lead (Pb), zirconium (Zr), zinc (Zn), erbium (Er), praseodymium (Pr), thulium (Tm), potassium (K), calcium, and other atomic or ionic species. The particular characteristics of interest in the present invention are the ability to act as an active or light amplifying material and to conduct cross relaxation between ions of the dopant, or energy transfer between the dopant and sensitizer ions.

The term "sensitizer ions" is used in the present invention to mean any extraneous element or combination thereof which is added to a material to enhance or suppress a characteristic of the dopant. Examples of sensitizer ions include, but are not limited to: ytterbium (Yb), praseodymium (Pr), thulium (Tm), terbium (Tb), europium (Eu), and erbium (Er), and other atoms or ions. The particular characteristics of interest in the present invention are the ability to enhance energy transfer between the dopant and the sensitizer ion. This in turn has the benefit of greatly increasing efficiency of the device as described below.

The term "cluster" or "ion cluster" is used in the present application to mean a grouping of dopants and/or sensitizer atoms or ions having a concentration that exceeds the average concentration of dopants and/or sensitizer atoms or ions in the material.

The term "resonant cavity" is used in the present invention to mean any means for reflecting light in the waveguide. Specific examples include, but are not limited to: external mirrors on one or both ends of the waveguide, reflective coatings on the end surfaces of the waveguide, gratings formed within or spliced to the waveguide, Fresnel reflections at the fiber ends, or any combination of the above.

The term "optical source" is used in the present invention to mean any means of inputting or generating a light wave in the waveguide. Specific examples include, but are not limited to: light emitting diodes, laser diodes, vertical cavity surface emitting lasers, laser bars, MFA-MOPAs, flared-resonator-type laser diodes, diode arrays, and other single-mode and multi-mode light sources. The particular characteristics of interest in the present invention are ability to provide high output power. It should be appreciated that electrical and electron beam sources may also be used in conjunction with the teachings of this invention. The term "energy source" includes both optical sources, electrical, and electron beam sources.

With reference to the Figures, wherein like references characters indicate like elements throughout the several views and, in particular, with reference to FIG. 1, an energy level diagram of a cross-relaxation process utilized with a preferred embodiment of the invention is illustrated.

The possibility of high power (greater than 200 mW) CW lasing at 2.7 $\mu$m in Er:ZBLAN, and particularly that of stable and efficient CW lasing of this transition has been a controversial issue till the discovery of the present invention. Applicants have found that the use of de-excitation of the $^4I_{13/2}$ energy level by a cross-relaxation mechanism is a solution for alleviation of bottlenecks in prior art teachings, particularly for the case of ~970–980 nm pumping. In this pumping region, the lack of significant ESA from the $^4I_{13/2}$ energy level as a depopulation pathway makes the need for other de-excitation mechanisms more critical.

The cross-relaxation mechanism involved here is that of the transfer of energy corresponding to the $^4I_{13/2}$–$^4I_{15/2}$ transition to upconvert a neighboring atom or dopant from the $^4I_{13/2}$ to $^4I_{9/2}$ (see FIG. 1, element 12). The atom subsequently relaxes to the $^4I_{11/2}$ energy level through a non-radiative process, thus creating a mechanism for the build-up of population inversion between the two levels.

Previous reports suggest that the cross-relaxation mechanism is invoked only for Er concentrations of >15 mole percent. However, it has been found that due to the formation of clusters in the waveguide, the cross-relaxation mechanism is invoked even at concentrations of 1%. As such, it has been found that the use of high Er concentrations (>10,000 ppm) as a means for enhancing this cross-relaxation mechanism is preferred. Additionally, it can now be demonstrated that relatively efficient operation of a CW 2.7 $\mu$m fiber laser, even while pumping at wavelengths (such as 980 nm) at which there is no significant ESA depopulation of the $^4I_{13/2}$ energy level by using an Er:ZBLAN fiber laser with an Er concentration of 10,000 ppm, is possible.

Also, it can now be demonstrated that alleviation of this bottleneck and strongly enhanced efficiencies and output powers by a simpler alternative technique viz the use of fibers with high concentrations (>10,000 ppm) of Er is possible. It has been shown that such high concentrations not only reduce the problem of ground state bleaching, but also invoke a cross-relaxation mechanism (denoted as element 12 in FIG. 1) which relaxes the excitation from the lower laser level ($^4I_{13/2}$) to the ground state ($^4I_{15/2}$) while upconverting an adjacent ion to the $^4I_{9/2}$ state.

With regard to the role of this cross-relaxation mechanism, a contrary piece of evidence has been reported for Er:ZBLAN bulk glasses by Bogdanov et al. entitled "Fluorescence from Highly-Doped Erbium Fluorozirconate Lasers Doped at 800 nm," Opt. Commn., 132, 73 (1996). This paper teaches that significant cross-relaxation was observed only at very high doping densities, i.e., 150,000 ppm in bulk glass.

Additionally, Bedö et al. in "Limits of the output power of $Er^{3+}$:ZBLAN singlemode fiber lasers," Electronic Letters, Vol. 31, No. 3, pp 199–200 (1995), disclose that the "highest output power,15.36 mW is achieved with the 1000 ppm fiber." The lack of performance in the higher doping concentrations was due, according to Bedö et al., to the long lifetime and consequent population bottleneck at the $^4I_{13/2}$ lower laser level. In contrast, it has been found that the presence of ions in clusters in highly doped Er:ZBLAN fibers allows for the cross-relaxation mechanism to function at significantly lower dopant concentrations while overcoming this bottleneck.

The quantification of the amount of clustering is done by an indirect optical technique based on the role of clusters on rapid repopulation of the ground state via cross-relaxation processes evidenced by a sharp decrease in the "normal" saturation of absorption observed for various transitions in Er:ZBLAN fibers. In particular, the inventors have demonstrated that over 50% of the Er ions are found in clusters in Er:ZBLAN fibers with nominal doping densities of 10,000 ppm and higher; this is deduced from fits of our new theoretical model to careful measurements of the saturation of absorption at the $^4I_{15/2}$–$^4I_{11/2}$ transition (972 nm) in Er:ZBLAN fibers.

Precise quantification of clustering levels is also important for the improved design of flatband compact 1.55 $\mu$m Er-doped fluoride silicate, tellleride and other fiber amplifiers (EDFFAs) and for the design of green upconversion-based Er:ZBLAN temperature sensors. In EDFFAs, high ion densities will be advantageous for increased power extraction and compactness, but are inhibited by the rapid decrease in gain at the onset of clustering; on the other hand, in upconversion-based temperature sensors, clustering acts favorably to increase the intensity of the green fluorescence from the $^4S_{3/2}$ level due to enhancement of the cross-relaxation process (denoted as element 14 in FIG. 1).

The role of high densities of ions in clusters on the phenomenon of the saturation of absorption in Er may be explained as follows. At low Er doping densities, the long lifetimes of the excited states ($^4I_{11/2}$ and $^4I_{13/2}$) leads to the depletion of the ground state population, which leads to saturation of absorption at several transitions (from the ground state). However, at high Er doping densities, the cross-relaxation processes discussed above may cause depletion of the $^4I_{13/2}$ and the $^4I_{11/2}$ population, thereby reducing this saturation of absorption. This is because when a large number of ions (n) are in the $^4I_{13/2}$ or in the $^4I_{11/2}$ state and are adjacent to each other in a cluster, all (but one) are de-excited to the $^4I_{15/2}$ ground state by n/2 cross-relaxations; this enhanced de-excitation inhibits the saturation of absorption that is observed at low doping densities.

Although the modeling and precise quantification is significantly different for Er:fluoride fibers because of the longer lifetimes of several of the excited states and the consequent increased importance of excited state absorption as well as of multiple cross-relaxation processes, the dominance of the cross-relaxation processes shown in FIG. 1 is still expected to be evidenced by a similar behavior in the saturation of absorption and in the increase in the non-saturable absorption (NSA) component at higher doping densities. Such a strong increase in NSA in Er:ZBLAN fibers is quantified with the use of a modified theoretical model described in further detail below.

Figure 2:
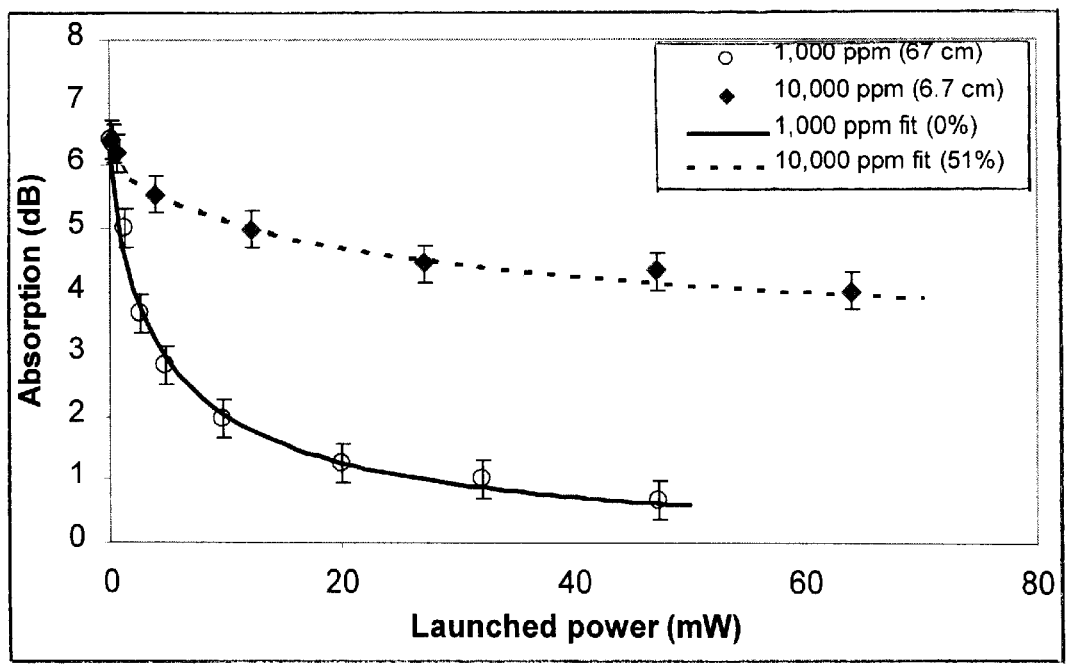
FIG. 2 is a graph of absorption v. launched power of a highly doped fiber constructed in accordance with a preferred embodiment of the invention.

Turning now to FIG. 2 is a graph of absorption v. launched power of a highly doped fiber constructed in accordance with a preferred embodiment of the invention is illustrated. As may be seen, some of the results obtained using the model are plotted in FIG. 2 along with our absorption data for waveguides with 1000 and 10,000 ppm Er doping densities. The absorption measurements were done using a Ti:Sapphire laser tuned to 972 nm (peak wavelength of absorption). The absorption $\alpha$ is given simply by:

$$\alpha = 10\log_{10}\left(\frac{P_{launch}}{P_{out}}\right) dB$$

where $P_{launch}$ is the 972 nm power launched into these single mode fibers.

In comparison to prior art models, applicant's model is modified by the incorporation of the long lifetimes of the excited states along with the resultant excited state absorption processes and also the inclusion of the cross-relaxation process, element 14, from the upper laser level because of the much larger population densities in this level for fluoride fibers. It is assumed that a certain fraction of ion population exists as homogeneously distributed ions in the fluoride host (denoted as $n_i$ where i=0, 1, 2, 3 as shown in FIG. 1) and that the rest are distributed in clusters (denoted as $n_i^*$). For the homogeneously ions, the modified rate equations are written as:

$$\frac{\partial n_0}{\partial t} = -W_{02}n_0 + (\gamma_{10} + W_{11}n_1)n_1 + (\gamma_{20} + W_{20} + W_{22}n_2)n_2 + \gamma_{30}n_3$$

$$\frac{\partial n_1}{\partial t} = -(\gamma_{10} + 2W_{11}n_1)n_1 + \gamma_{21}n_2 + \gamma_{31}n_3$$

$$\frac{\partial n_2}{\partial t} = -(\gamma_2 + W_{20} + 2W_{22}n_2 + W_{23})n_2 + \gamma_{32}n_3 + W_{02}n_0 + W_{11}n_1^2$$

$$\frac{\partial n_3}{\partial t} = -\gamma_3 n_3 + (W_{23} + W_{22}n_2)n_2$$

where $W_{ij}$ is the absorption rate for the transition from level i to level j, $W_{ji}$ is the stimulated emission rate, $\gamma_{ij}$ is the sum of the radiative and non-radiative relaxation rate, and $W_{11}$ and $W_{22}$ are the cross-relaxation rates for the processes #12 and #14 shown in FIG. 1.

Note that the fractions of ions that are present in clusters, $n_0^*$, $n_1^*$, and $n_2^*$, are assumed to be 1, 0, and 0 respectively because of the rapid de-excitation of the populations of levels 1 and 2 due to cross-relaxation processes, whereas $n_3^*$ is assumed to be 0 since the steady state population is negligible for ions in clusters. The above rate equations were solved to obtain the fractional population density of the different energy levels which was then used to determine the evolution of the absorption along the length of the fiber.

Note that the model developed here uses measured values of lifetimes and branching ratios, as well as known cross-relaxation rates, and uses no free parameters for the fits other than an assumption of the fraction of total ions that are in clusters. Specifically, values of $1.2 \times 10^{-25}$ cm$^2$ were used for the absorption cross-section ($\sigma_p$), $4 \times 10^{-17}$ cm$^3$/sec for the cross-relaxation rate $W_{11}$, and $5 \times 10^{-17}$ cm$^3$/sec for the cross-relaxation rate $W_{22}$ in the model. As such, the excellent agreement between the model and the data gives a strong indication of the percentage of ions in clusters (51% in the 10,000 ppm compared to none in the 1000 ppm fiber). The presence of clusters satisfactorily explains why fiber lasers based on fibers with average doping concentrations much lower than those specified by Bogdanov et al. apparently shows efficiency enhancements due to the cross-relaxation processes.

Because clustering in rare earth doped fibers depends strongly on defect centers created, the measurement of the NSA represents a powerful new diagnostic technique to evaluate the quality of the fiber drawing process.

Moreover, where the $^4I_{11/2}$ level (i.e. level 2 in the above model) is pumped directly, the fits of calculations based on the model to the data are found to be very sensitive to the exact value chosen for the cross-relaxation rate $W_{22}$. As such, this technique may represent an extremely powerful method for estimating the cross-relaxation rate $W_{22}$ with high precision with respect to conventional methods that involve lifetime measurements as a function of concentration. Likewise, direct pumping into level 1 (with 1480 nm) may be used to determine $W_{11}$ with high precision.

Figure 3:
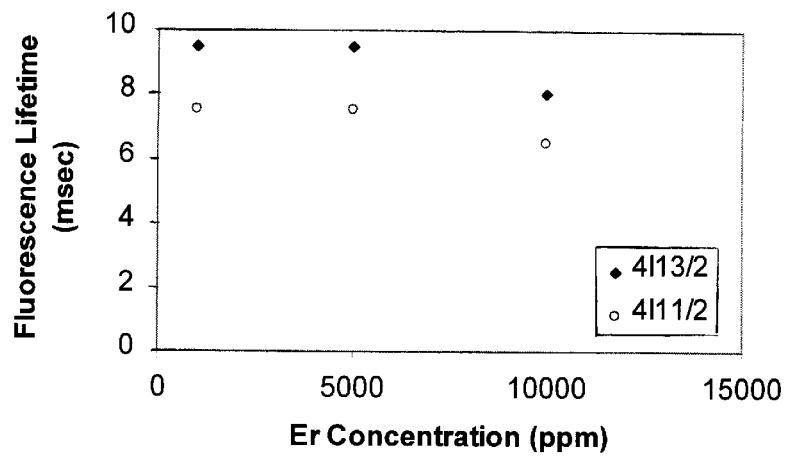
FIG. 3 is a graph of fluorescence lifetime v. dopant concentration for a highly doped fiber constructed in accordance with a preferred embodiment of the invention.

Turning now to FIG. 3, a graph of fluorescence lifetime v. dopant concentration for a highly doped fiber constructed in accordance with a preferred embodiment of the invention is illustrated. As may be seen, the fluorescence for the $^4I_{11/2}$ energy level is illustrated by open circles while that for the $^4I_{13/2}$ is illustrated by filled diamonds. As the concentration of the dopant increases, the fluorescence lifetime decreases. Thus, it is desirable to maintain the dopant concentration between 100 and 500,000 for the most effective fluorescence lifetime while also promoting mechanisms that result in the formation of clusters. It is advantageous to induce defects such as fiber drawings induced defects, ion implantation, or radiation damage or any method in the appropriate bulk material or waveguide. In some cases, such as the bulk materials, it may be preferable that these defects be introduced prior to the introduction of the dopant in to the bulk material or waveguide.

Figure 4:
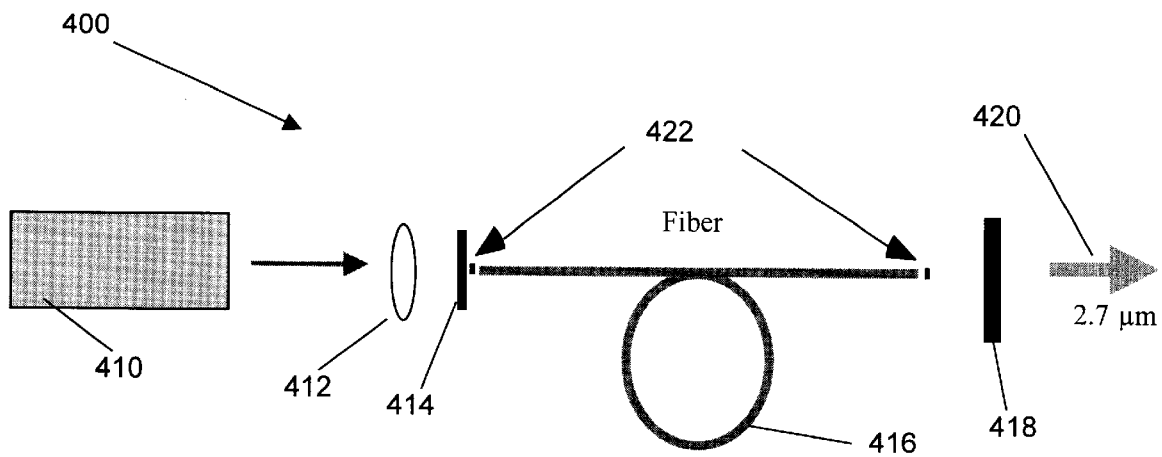
FIG. 4 is a block diagram of a highly doped fiber laser and/or amplifier constructed in accordance with a preferred embodiment of the invention.

FIG. 4 is a block diagram of a highly doped fiber laser 400 constructed in accordance with a preferred embodiment of the invention. As may be seen laser amplifier 400 includes an optical source 410 which is optically coupled by means of a lens or lens system 412 to an input end of an optical waveguide 416 that is doped with a dopant and/or sensitizer atoms or ions as discussed above. In a preferred embodiment, the dopant would be Er and have a concentration between 100 and 500,000 ppm. A resonant cavity 422 may be defined by mirror 414, waveguide 416 and mirror/uncoated end 422 located distal from mirror 414. Filter 418 is provided to pass the desired frequency of interest for the output laser light 420 that is emitted from an output end of fiber 416.

It is preferable to use a double clad fiber for waveguide 416. Such fibers have a small diameter central core, preferably supporting only a single spatial mode of light propagation, which is doped with a dopant capable of undergoing cross-relaxation when it is optically pumped, and which serves as a waveguide for laser light 420. The core is preferably a fluoride glass because of the material's long lived intermediate states and broad pump absorption bands. The glass may be formed from a suitable mixture of some or all of $ZrF_4$, $HfF_4$, $BaF_2$, $SrF_2$, $LaF_3$, $YF_3$, $AlF_3$, KF, NaF, LiF or any other suitable fluoride in any combination. Florozirconate waveguides, i.e., containing $ZrF_4$ as the primary ingredient, such as ZBLAN are widely available in the fiberoptic telecommunications industry. While fluoride based fibers are preferred, other fiber materials may be used, such as, but not limited to: chalcogenides, tellurides, and silicates. Examples of such materials include, but are not limited to: phosphate, silicate, borate and borosilicate glasses. The core diameter is preferably in a range from 0.1 $\mu$m to 100 $\mu$m.

The core is surrounded by an inner cladding having a lower refractive index the core and thus confines light in the central cores. The inner cladding diameter is preferably in a range from 1 $\mu$m to 10,000 $\mu$m. The outer cladding has the lowest refractive index and surrounds the inner cladding and central core. The outer cladding diameter is preferably in a range from 1 $\mu$m to 100,000 $\mu$m. While a circular geometry has been implied by the above construction, it should be appreciated that the teachings of this invention are not limited to any particular geometry or the use of a double cladding fiber. In fact, conventional single cladding or multi-cladding fibers may be used and have been used (see FIG. 10) in conjunction with the teachings of this invention so long as they are modified by dopants as described above.

The use of double-clad fiber permits the use of high power (at least 100 mW) multimode or broadband lasers pump sources 410, such as but not limited to single mode or multi-mode sources and laser bars or arrays, MFA-MOPAs or flared-resonator-type laser diodes, as well as the use of high power diode-laser-pumped fiber-laser pump sources.

As discussed above, with the introduction of energy from source 410, the cross-relaxation process is initiated. Because of the presence of clusters, this cross-relaxation process may be conducted with concentrations of dopants being below 150,000 ppm.

Figure 5:
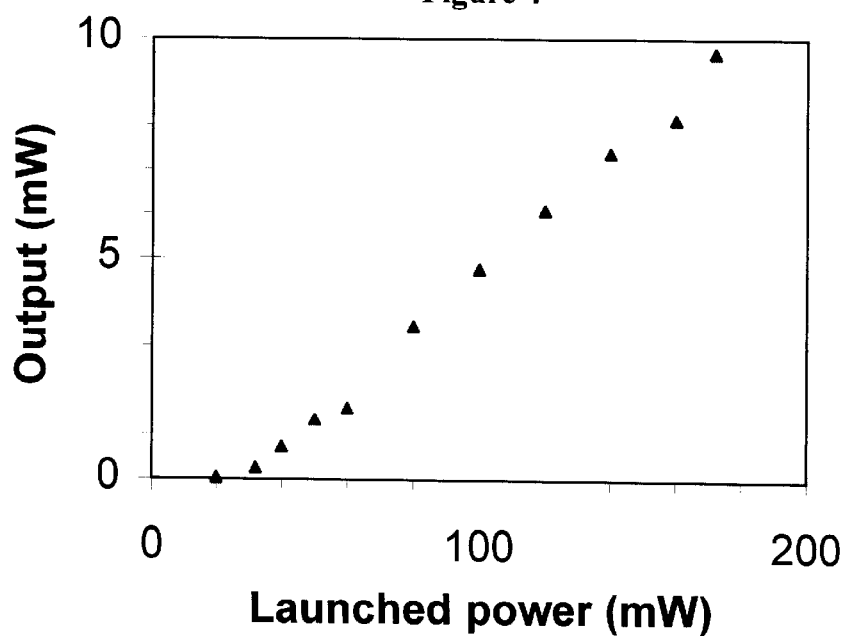
FIG. 5 is a graph of output power v. launched power for a highly doped fiber laser and/or amplifier constructed in accordance with a preferred embodiment of the invention.

Turning now to FIG. 5, a graph of output power v. launched power for a highly doped fiber laser constructed in accordance with a preferred embodiment of the invention is illustrated. As may be seen, a substantial amount of power output may be generated by the use of the teachings of the present invention. For example, it is possible to achieve output powers in the range of 10 mW with a launched power input of only 180 mW. This is a substantial improvement over prior art devices.

Figure 6:
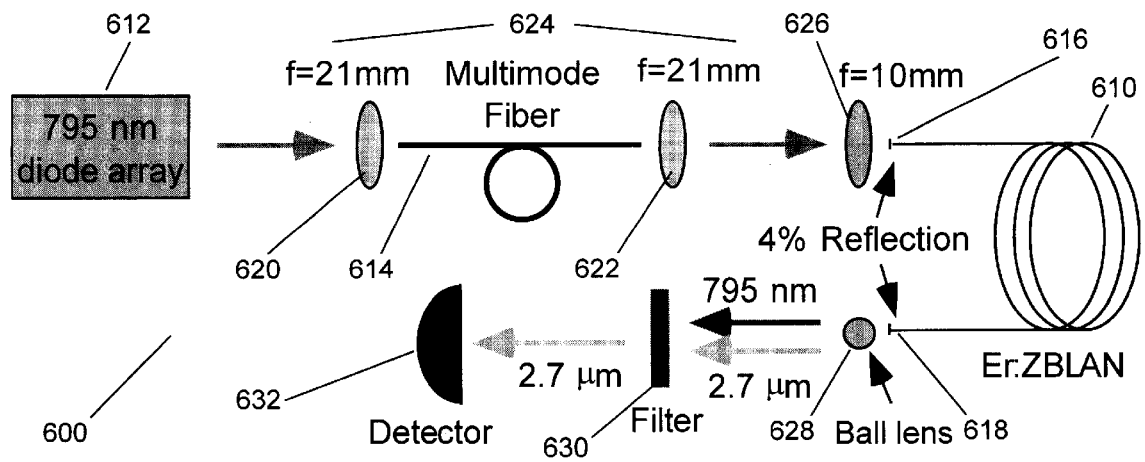
FIG. 6 is a block diagram of a highly doped fiber laser and/or amplifier constructed in accordance with an alternate embodiment of the invention.

Turning now to FIG. 6, a block diagram of a highly doped fiber laser constructed in accordance with an alternate embodiment of the invention is illustrated. The purpose of this illustration is to indicate that any pre or post processing elements may be present in an optical system that utilizes the teachings of the present invention.

Figure 7:
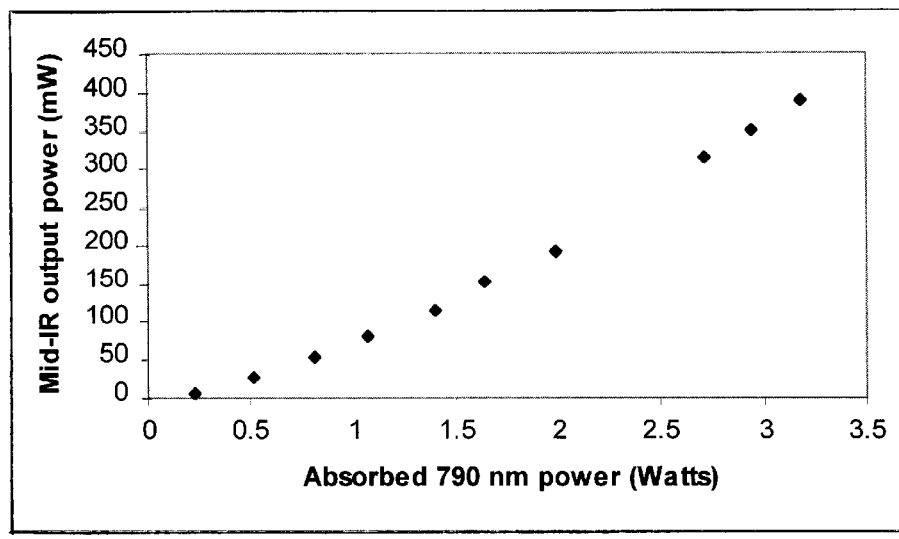
FIG. 7 is a graph of output power v. absorbed power for the highly doped fiber laser illustrated in FIG. 6.

As may be seen from FIG. 7, a stable high power (390 mW) CW output from a 2.7 µm fiber laser is achievable. Note that these power levels represent over an order of magnitude increase in the power reported previously from diode-pumped Er:ZBLAN fiber lasers. Moreover, in contrast with previous reports, in which 1000 ppm was identified as the optimal doping density, an unique enabling feature leading to the results reported here is the use of high Er doping densities (20,000 ppm), which enables a rapid depletion of the lower laser level through cross-relaxation processes. These high doping densities also enable the exploitation of double-clad fiber geometries, capable of being pumped by relatively inexpensive high power diode arrays, while keeping optimal waveguide lengths relatively short, i.e., on the order of ten meters. FIG. 6 illustrates a simple mirrorless design which is directly pigtailable to the pump diode, representing a much more commercially viable alternative to previous high power 2.7 µm fiber laser designs that invoke cascade lasing processes by using complex and expensive multi-resonant mirror coatings.

A double-clad Er:ZBLAN waveguide 610 that was used was approximately 20 m long, with an Er doping density of 20,000 ppm in a single mode 3.8 µm, 0.28 NA core surrounded by a concentric 125 µm 0.5 NA cladding. The pump source 612 was an Optopower diode array operating at a wavelength of 795 nm, and capable of yielding nearly 20 Watts of CW power in a 8 mm×8 mm beam of 5 mrad divergence. A multimode silica fiber 614 (250 µm core diameter) was used to condition the spatial profile of the pump beam so as to improve its coupling efficiency to the double-clad Er:ZBLAN waveguide 610 while inhibiting the possibility of damaging its ends. No dielectric mirrors were used for the laser cavity, and feedback was obtained simply by the ~4% Fresnel reflections at the two uncoated fiber ends 616,618.

Post processing is provided by a lens 628, which is preferably a sapphire ball lens, and a filter 630 that passes the desired output frequency. Finally, a detector 632 was provided for measuring purposes. In an operational device, detector 632 may be replaced by conventional Electro-Optic components.

The throughput ($\eta_1$) of the beam-shaping multimode fiber and the related lens pair 620, 622 was 80%. This near-collimated 9 mm diameter beam exiting the beam conditioning setup 624 was then focused into the inner cladding of the double-clad Er:ZBLAN waveguide 610 by another aspheric lens 626 of 10 mm focal length with a net coupling efficiency ($\eta_2$) of 55%. In this preliminary unoptimized setup, the effective launch efficiency ($\eta_3=\eta_1\times\eta_2$) of the diode array beam into the double-clad fiber was thus only 45%.

As observed through measurements of unabsorbed pump power at the end of the 20 m double-clad waveguide 610, the effective absorption ($\alpha$) of the pump light was only 50%, leading to utilization of only $\beta=\alpha\times\eta_3$ i.e., only ~22% of the pump photons available at the output of the pump diode laser in this unoptimized experiment.

FIG. 7 shows a plot of output power as a function of the absorbed pump power. The mid-IR power in FIG. 7 corresponds to the total mid-IR power output from both ends of the fiber laser 600. There was no evidence of lasing at either 1.55 µm or 1.7 µm or the onset of the cascade lasing phenomenon in the experiments, as verified carefully by detailed spectral observations. Note that even at the highest pump power level, there is no sign of saturation of output power from fiber laser 600, and the overall pump-to-mid-IR conversion efficiency is ~12% implying promise for a relatively efficient laser and high power outputs in optimized designs.

One improvement in the overall efficiency may be obtained with the use of longer fibers (tens of meters) to more completely absorb the pump radiation, thereby increasing $\alpha$ and $\beta$ by approximately a factor of 2 or more. Furthermore, it is anticipated that a factor of two improvement in $\eta_2$ through the use of a larger diameter aspheric lens, leading to an overall increase in the pump utilization parameter $\beta$ by a factor of 4 (up to ~85%). Finally, the diode pump power may easily be increased to over 40 W by polarization multiplexing two 20 W arrays. As such, output power scaling to well above 1 Watt level is now possible.

Figure 8:
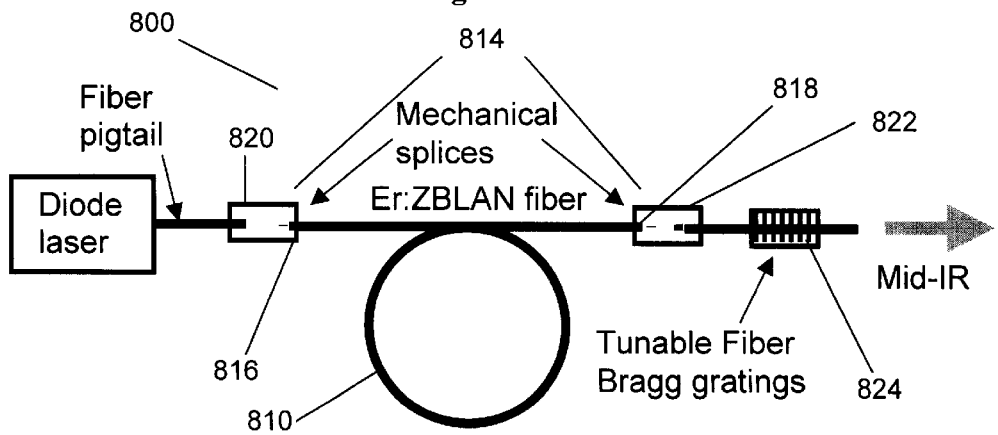
FIG. 8 is a block diagram of a highly doped fiber laser and/or amplifier constructed in accordance with an alternate embodiment of the invention.

Turning now to FIG. 8, a block diagram of a highly doped fiber laser constructed in accordance with an alternate embodiment of the invention is illustrated. This embodiment is provided to illustrate the use of coatings on waveguide 810 and thus eliminate the need for bulk optical elements between source 812 and waveguide 810. An optical cavity 814 is created by providing at least partially reflective coatings 816, 818 on respective ends of waveguide 810. These coatings 816,818 may be dielectric, metallic, or just cleaved fiber ends. It should be appreciated that it is not necessary to provide both coatings 816,818 and in fact, it may be preferable to eliminate one or more coatings and thus form an amplifier instead of a laser. Additionally, it may be desirable to provide antireflective coatings instead of the reflective coatings. Waveguide 810 is preferably coupled to source 810 via a mechanical splice 820 or fiber side-coupling through v-grooves etched in the outer cladding or any other coupling means known in the waveguide art. In a similar fashion, the distal end of waveguide 810 is coupled to a filter or external mirror 824 via a mechanical splice 822 or any other coupling means known in the waveguide art. In a preferred embodiment, filter or external mirror 824 would be a tunable Bragg grating. Suitable Bragg gratings include those disclosed in U.S. patent application Ser. No. 09/246, 125, entitled "Tunable Bragg Gratings and Devices Employing the Same," to Jain et al, now U.S. Pat. No. 6,221,565. This application is hereby incorporated in its entirety by reference.

Figure 9:
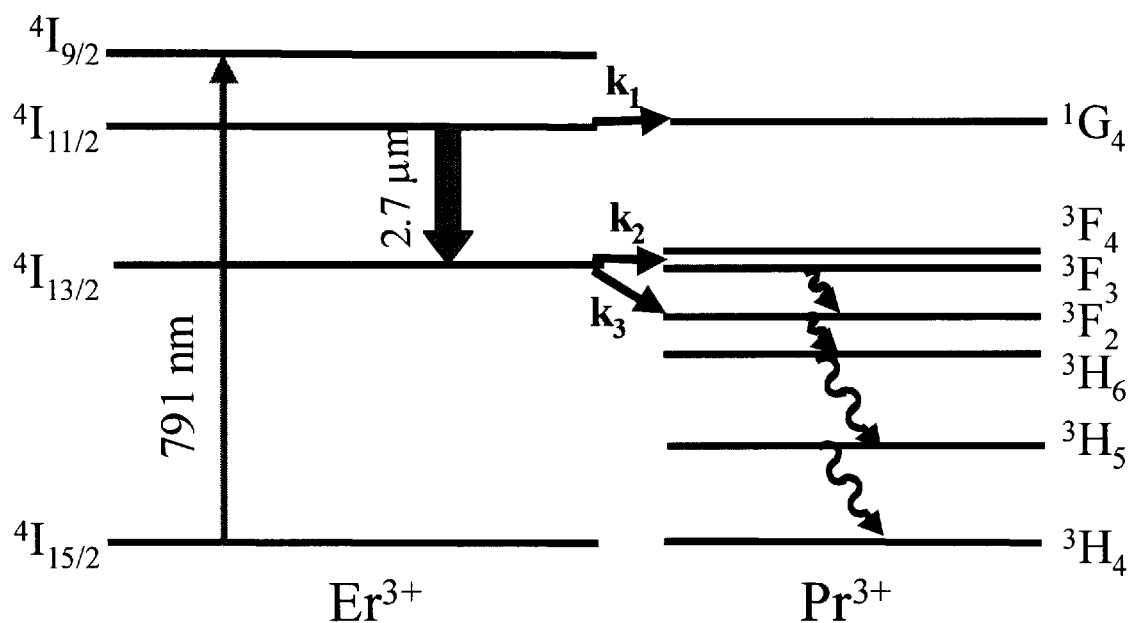
FIG. 9 is an energy level diagram of an enhanced energy transfer process for de-excitation of the lower laser level in Er and utilized with another preferred embodiment of the invention.

Turning now to FIG. 9, an energy level diagram of an energy transfer process utilized with another preferred embodiment of the invention is illustrated. The principal difference between this embodiment and the embodiment of FIG. 1 is the use of sensitizer ions in combination with dopant ions to enhance energy transfer by depleting the $^4I_{13/2}$ level.

The population bottleneck mentioned above may be alleviated through an enhanced cross-relaxation process at high doping densities as has been observed by Bogdanov et al. at Er concentrations of >15% in ZBLAN bulk glasses. However, it has now been found that the onset of Er ion clustering (presumably at sites corresponding to drawing-induced defects) may significantly enhance the cross-relaxation even at much lower doping densities (1%), corresponding to doping densities that are relatively easy to achieve with current fiber fabrication techniques. A fringe benefit of the use of high Er doping densities is the natural amenability of the consequent high core absorption to optimized designs of double-clad fibers capable of being pumped by relatively inexpensive high power diode arrays.

It can also now be demonstrated that high power and efficient operation of the 2.7 $\mu$m transition in $Er^{3+}$ by further enhancing the rate of depletion of the $^4I_{13/2}$ level of $Er^{3+}$ by energy transfer to the $^3F_3$ and the $^3F_4$ levels of $Pr^{3+}$. The rare-earth concentration was chosen to be 20,000 ppm of Er and 5,000 ppm of Pr based on the requirements of efficient absorption in $Er^{3+}$ and rapid depopulation of the lower laser level (via enhanced cross-relaxation in Er and efficient energy transfer to Pr). The lifetime for the $^4I_{13/2}$ level was measured to be 0.7 ms for this specific co-doped system (vs. ~2 ms for a singly-doped 20,000 ppm Er:ZBLAN fiber). The inner cladding of the custom-made Thorlabs double-clad fiber was designed to be 100 $\mu$m×200 $\mu$m and 0.55 NA. In order to match the OptoPower 791 nm diode array beam shape to the rectangular-clad fiber, a cylindrical lens whose axis was rotated with respect to the plane of the diode array was used to optimize coupling; the net coupling efficiency and effective absorption coefficient were measured to be 65% and 0.6 dB/m respectively. The total absorption for the 14 m long fiber was ~85%.

Figure 10:
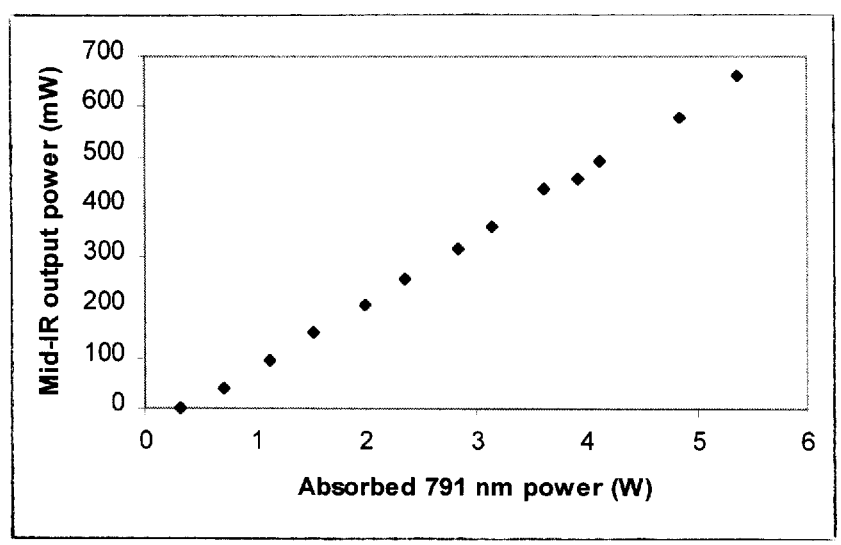
FIG. 10 is a graph of output power v. absorbed power for the highly doped fiber laser illustrated in FIG. 9.

FIG. 10 shows the 2.7 $\mu$m output power as a function of the absorbed 791 nm diode power. As seen from the above plot, the laser threshold is 330 mW and the slope efficiency is 13% with respect to the absorbed power; the threshold corresponds to a round-trip gain of 29.4 dB at a pump power density of 1.65 kW/cm². The linearity of the plot clearly indicates scalability to Watt power levels using higher pump powers or more efficient pump coupling and pump absorption techniques.

It should be appreciated that while the cross-relaxation process and energy transfer process have been discussed together, they are two distinctly different processes which may be utilized independently. It has been found that these distinct processes may also be used in combination to enhance the overall effect desired in the present invention.

It should be appreciated that while the above discussion has focused mainly on the use of Er as dopant, other dopants may be utilized that allow cross-relaxation to other energy levels, as discussed above in the definitions section, in conjunction with the teachings of this invention. In addition, while the above discussion has focused on waveguide lasers, it should be appreciated that amplifiers may be constructed by the elimination of one or more mirror or reflective coatings in the optical cavity.

Finally, the teachings of the present invention may also be used in conjunction with wavelength-tunable and pulsed (Q-switched and mode-locked) high peak power sources based on such lasers; the latter should also enable the generation of longer mid-IR wavelengths relatively easily via efficient nonlinear optical (Raman/DFG) techniques.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A highly doped waveguide comprising:
    a waveguide having a dopant disposed therein, said dopant having a concentration of between 1,001 and 500,000 ppm, wherein said waveguide contains clusters of said dopant, wherein at least 50% of said dopant is in said clusters, and wherein said clusters of said dopant enhance cross-relaxation between two elements of said dopant.

2. The waveguide recited in claim 1, wherein said dopant is Er.

3. The waveguide recited in claim 1, wherein said waveguide is composed of at least one low phonon energy material selected from the group consisting of: $ZrF_4$, $HfF_4$, $BaF_2$, $SrF_2$, $LaF_3$, $YF_3$, $AlF_3$, KF, NaF, LiF, chalcogenides, tellurides, silicates, chelates, and mixtures thereof.

4. The waveguide recited in claim 3, wherein said waveguide comprises $ZrF_4$, $BaF_2$, $LaF_3$, and NaF.

5. The waveguide recited in claim 1, wherein said dopant is at least one member selected from the group consisting of: germanium (Ge), hydrogen (H), holmium (Ho), sodium (Na), lithium (Li), lead (Pb), zirconium (Zr), zinc (Zn), erbium (Er), praseodymium (Pr), thulium (Tm), potassium (K), calcium, other rare earth ionic species, and mixtures thereof.

6. The waveguide recited in claim 1, further comprising sensitizer ions disposed in said waveguide, said sensitizer ions for increasing energy transfer between said dopant and said sensitizer ions; and
    wherein said waveguide contains clusters of said dopant; and wherein said sensitizer ions assist in depopulation of the desired energy level of said dopant through energy transfer between said dopant and said sensitizer ions.

7. The waveguide recited in claim 6, wherein said sensitizer ions are at least one member selected from the group consisting of: ytterbium (Yb), praseodymium (Pr), thulium (Tm), terbium (Tb), europium (Eu), neodymium (Nd), samarium (Sm), erbium (Er), and mixtures thereof.

8. The waveguide recited in claim 1, further comprising an energy source and a resonant cavity at a pump wavelength, said resonant cavity being defined by first and second reflective means disposed at either end of said waveguide.

9. The waveguide recited in claim 1, further comprising an energy source for injecting energy into said waveguide and thereby forming a highly doped waveguide amplifier.

10. The waveguide recited in claim 1, further comprising a first and second reflective means at an amplification wavelength disposed at opposite ends of said waveguide.

11. The waveguide recited in claim 10, further comprising an energy source for injecting energy into said waveguide and thereby forming a highly doped waveguide laser.

12. The waveguide recited in claim 1, wherein said concentration of said dopant is greater than 5,000 ppm.

13. A highly doped waveguide comprising:
   a waveguide having a dopant disposed therein, said dopant having a concentration of greater than 5,000 ppm and no more than 500,000 ppm; and
   wherein said waveguide contains clusters of said dopant and said clusters of said dopant enhance cross-relaxation between two elements of said dopant.

14. The waveguide recited in claim 13, wherein at least 0.1% of said dopant is in clusters.

15. The waveguide recited in claim 13, wherein at least 1% of said dopant is in clusters.

16. The waveguide recited in claim 13, wherein at least 10% of said dopant is in clusters.

17. The waveguide recited in claim 13, wherein said dopant is Er.

18. The waveguide recited in claim 13, wherein said waveguide is composed of at least one low phonon energy material selected from the group consisting of: $ZrF_4$, $HfF_4$, $BaF_2$, $SrF_2$, $LaF_3$, $YF_3$, $AlF_3$, KF, NaF, LiF, chalcogenides, tellurides, silicates, chelates, and mixtures thereof.

19. The waveguide recited in claim 18, wherein said waveguide comprises $ZrF_4$, $BaF_2$, $LaF_3$, and NaF.

20. The waveguide recited in claim 13, wherein said dopant is at least one member selected from the group consisting of: germanium (Ge), hydrogen (H), holmium (Ho), sodium (Na), lithium (Li), lead (Pb), zirconium (Zr), zinc (Zn), erbium (Er), praseodymium (Pr), thulium (Tm), potassium (K), calcium, other rare earth ionic species, and mixtures thereof.

21. The waveguide recited in claim 13, further comprising sensitizer ions disposed in said waveguide, said sensitizer ions for increasing energy transfer between said dopant and said sensitizer ions; and
   wherein said waveguide contains clusters of said dopant; and wherein said sensitizer ions assist in depopulation of the desired energy level of said dopant through energy transfer between said dopant and said sensitizer ions.

22. The waveguide recited in claim 21, wherein said sensitizer ions are at least one member selected from the group consisting of: ytterbium (Yb), praseodymium (Pr), thulium (Tm), terbium (Tb), europium (Eu), neodymium (Nd), samarium (Sm), erbium (Er), and mixtures thereof.

23. The waveguide recited in claim 13, further comprising an energy source and a resonant cavity at a pump wavelength, said resonant cavity being defined by first and second reflective means disposed at either end of said waveguide.

24. The waveguide recited in claim 13, further comprising an energy source for injecting energy into said waveguide and thereby forming a highly doped waveguide amplifier.

25. The waveguide recited in claim 13, further comprising a first and second reflective means at an amplification wavelength disposed at opposite ends of said waveguide.

26. The waveguide recited in claim 25, further comprising an energy source for injecting energy into said waveguide and thereby forming a highly doped waveguide laser.

27. A highly doped waveguide comprising:
   a waveguide having a dopant disposed therein, said dopant having a concentration of between 1,001 and 500,000 ppm, said dopant being Er;
   wherein said waveguide is composed of at least one material selected from the group consisting of: GaN, ZnS, AlAs, GaAs, ZnSe, YLF, BaYF, $ZrF_4$, HfF4, $BaF_2$, $SrF_2$, $LaF_3$, $YF_3$, $AlF_3$, KF, NaF, LiF, chalcogenides, tellurides, silicates, chelates, and mixtures thereof; and
   wherein said waveguide contains clusters of said dopant, wherein at least 50% of said dopant is in said clusters, and wherein said clusters of said dopant enhance cross-relaxation between two elements of said dopant.

28. The waveguide recited in claim 27, further comprising sensitizer ions disposed in said waveguide for causing energy transfer between said dopant and said sensitizer ions; and
   wherein said waveguide contains clusters of said dopant; and wherein said sensitizer ions assist in depopulation of the desired energy level of said dopant through energy transfer between said dopant and said sensitizer ions.

29. The waveguide recited in claim 28, wherein said sensitizer ions are at least one member selected from the group consisting of: ytterbium (Yb), praseodymium (Pr), thulium (Tm), terbium (Tb), europium (Eu), neodymium (Nd), samarium (Sm), erbium (Er), and mixtures thereof.

30. The waveguide recited in claim 27, further comprising an energy source and a resonant cavity at a pump wavelength, said resonant cavity being defined by first and second reflective means disposed at either end of said waveguide.

31. The waveguide recited in claim 27, further comprising an energy source for injecting energy into said waveguide and thereby forming a highly doped waveguide amplifier.

32. The waveguide recited in claim 27, further comprising a first and second reflective means at an amplification wavelength disposed at opposite ends of said waveguide.

33. The waveguide recited in claim 32, further comprising an energy source for injecting energy into said waveguide and thereby forming a highly doped waveguide laser.

34. The highly doped waveguide recited in claim 27, wherein said waveguide comprises $ZrF_4$, $BaF_2$, $LaF_3$, and NaF.

35. The waveguide recited in claim 27, wherein said concentration of said dopant is greater than 5,000 ppm.

36. A highly doped waveguide comprising:
   a waveguide having a dopant disposed therein, said dopant having a concentration greater than 5,000 ppm and no more than 500,000 ppm, said dopant being Er;
   wherein said waveguide is composed of at least one material selected from the group consisting of: GaN, ZnS, AlAs, GaAs, ZnSe, YLF, BaYF, $ZrF_4$, $HfF_4$, $BaF_2$, $SrF_2$, $LaF_3$, $YF_3$, A $IF_3$, KF, NaF, LiF, chalcogenides, tellurides, silicates, chelates, and mixtures thereof; and
   wherein said waveguide contains clusters of said dopant and said clusters of said dopant enhance cross-relaxation between two elements of said dopant.

37. The waveguide recited in claim 36, wherein at least 0.1% of said dopant is in clusters.

38. The waveguide recited in claim 36, wherein at least 1% of said dopant is in clusters.

39. The waveguide recited in claim 36, wherein at least 10% of said dopant is in clusters.

40. The waveguide recited in claim 36, further comprising sensitizer ions disposed in said waveguide for causing energy transfer between said dopant and said sensitizer ions; and
   wherein said waveguide contains clusters of said dopant; and wherein said sensitizer ions assist in depopulation of the desired energy level of said dopant through energy transfer between said dopant and said sensitizer ions.

41. The waveguide recited in claim 40, wherein said sensitizer ions are at least one member selected from the group consisting of: ytterbium (Yb), praseodymium (Pr), thulium (Tm), terbium (Tb), europium (Eu), neodymium (Nd), samarium (Sm), erbium (Er), and mixtures thereof.

42. The waveguide recited in claim 36, further comprising an energy source and a resonant cavity at a pump wavelength, said resonant cavity being defined by first and second reflective means disposed at either end of said waveguide.

43. The waveguide recited in claim 36, further comprising an energy source for injecting energy into said waveguide and thereby forming a highly doped waveguide amplifier.

44. The waveguide recited in claim 36, further comprising a first and second reflective means at an amplification wavelength disposed at opposite ends of said waveguide.

45. The waveguide recited in claim 44, further comprising an energy source for injecting energy into said waveguide and thereby forming a highly doped waveguide laser.

46. A highly doped waveguide laser comprising:
a low phonon energy waveguide having a dopant disposed therein, said dopant having a concentration greater than 5,000 ppm and no more than 500,000 ppm, said dopant being Er;
a resonant cavity, said resonant cavity being defined by a first and second reflective means at an amplification wavelength and disposed at opposite ends of said waveguide;
an energy source for injecting energy into said waveguide; and
wherein said waveguide contains clusters of said dopant and said clusters of said dopant enhance cross-relaxation between two elements of said dopant.

47. The waveguide laser recited in claim 46, further comprising sensitizer ions disposed in said waveguide for causing energy transfer between said dopant and said sensitizer ions; and
wherein said waveguide contains clusters of said dopant; and wherein said sensitizer ions assist in depopulation of the desired energy level of said dopant through energy transfer between said dopant and said sensitizer ions.

48. The waveguide laser recited in claim 47, wherein said sensitizer ions are at least one member selected from the group consisting of: ytterbium (Yb), praseodymium (Pr), thulium (Tm), terbium (Tb), europium (Eu), neodymium (Nd), samarium (Sm), erbium (Er), and mixtures thereof.

49. The waveguide laser recited in claim 46, wherein said waveguide is composed of at least one material selected from the group consisting of: GaN, ZnS, AlAs, GaAs, ZnSe, YLF, BaYF, $ZrF_4$, $HfF_4$, $BaF_2$, $SrF_2$, $LaF_3$, $YF_3$, $AlF_3$, KF, NaF, LiF, chalcogenides, tellurides, silicates, chelates, and mixtures thereof.

50. The waveguide laser recited in claim 49, wherein said waveguide comprises $ZrF_4$, $BaF_2$, $LaF_3$, and NaF.

51. The waveguide laser recited in claim 46, wherein at least 0.1% of said dopant is in clusters.

52. The waveguide laser recited in claim 46, wherein at least 1% of said dopant is in clusters.

53. The waveguide laser recited in claim 46, wherein at least 10% of said dopant is in clusters.

54. The waveguide laser recited in claim 46, wherein at least 50% of said dopant is in clusters.

55. A highly doped waveguide amplifier comprising:
a low phonon energy waveguide having a dopant disposed therein, said dopant having a concentration greater than 5,000 ppm and no more than 500,000 ppm, said dopant being Er;
an energy source for injecting energy into said waveguide and thereby forming a highly doped waveguide amplifier; and
wherein said waveguide contains clusters of said dopant and said clusters of said dopant enhance cross-relaxation between two elements of said dopant.

56. The waveguide amplifier recited in claim 55, further comprising sensitizer ions disposed in said waveguide for causing energy transfer between said dopant and said sensitizer ions; and
wherein said waveguide contains clusters of said dopant; and wherein said sensitizer ions assist in depopulation of the desired energy level of said dopant through energy transfer between said dopant and said sensitizer ions.

57. The waveguide amplifier recited in claim 56, wherein said sensitizer ions are at least one member selected from the group consisting of: ytterbium (Yb), praseodymium (Pr), thulium (Tm), terbium (Tb), europium (Eu), neodymium (Nd), samarium (Sm), erbium (Er), and mixtures thereof.

58. The waveguide amplifier recited in claim 55, wherein said waveguide is composed of at least one material selected from the group consisting of: GaN, ZnS, AlAs, GaAs, ZnSe, YLF, BaYF, $ZrF_4$, $HfF_4$, $BaF_2$, $SrF_2$, $LaF_3$, $YF_3$, $AlF_3$, KF, NaF, LiF, chalcogenides, tellurides, silicates, chelates, and mixtures thereof.

59. The waveguide amplifier recited in claim 58, wherein said waveguide comprises $ZrF_4$, $BaF_2$, $LaF_3$, and NaF.

60. The waveguide amplifier recited in claim 55, wherein at least 1% of said dopant is in clusters.

61. The waveguide amplifier recited in claim 55, wherein at least 10% of said dopant is in clusters.

62. A highly doped waveguide amplifier comprising:
a low phonon energy waveguide having a dopant disposed therein, said dopant having a concentration of between 1,001 and 500,000 ppm, said dopant being Er;
an energy source for injecting energy into said waveguide and thereby forming a highly doped waveguide amplifier, wherein said waveguide contains clusters of said dopant, wherein at least 50% of said dopant is in clusters, and wherein said clusters of said dopant enhance cross-relaxation between two elements of said dopant.

63. The waveguide amplifier recited in claim 62, wherein said concentration of said dopant is greater than 5,000 ppm.

64. The waveguide amplifier recited in claim 62, further comprising sensitizer ions disposed in said waveguide for causing energy transfer between said dopant and said sensitizer ions; and
wherein said waveguide contains clusters of said dopant; and wherein said sensitizer ions assist in depopulation of the desired energy level of said dopant through energy transfer between said dopant and said sensitizer ions.

65. The waveguide amplifier recited in claim 64, wherein said sensitizer ions are at least one member selected from the group consisting of: ytterbium (Yb), praseodymium (Pr), thulium (Tm), terbium (Tb), europium (Eu), neodymium (Nd), samarium (Sm), erbium (Er), and mixtures thereof.

66. The waveguide amplifier recited in claim 62, wherein said waveguide is composed of at least one material selected from the group consisting of: GaN, ZnS, AlAs, GaAs, ZnSe, YLF, BaYF, $ZrF_4$, $HfF_4$, $BaF_2$, $SrF_2$, $LaF_3$, $YF_3$, $AlF_3$, KF, NaF, LiF, chalcogenides, tellurides, silicates, chelates, and mixtures thereof.

67. The waveguide amplifier recited in claim 66, wherein said waveguide comprises $ZrF_4$, $BaF_2$, $LaF_3$, and NaF.

68. A highly doped optical material comprising:
a low phonon energy bulk material having a dopant disposed therein, said dopant having a concentration of greater than 5,000 ppm and no more than 500,000 ppm, said bulk material containing clusters of said dopant; and
wherein said clusters enhance cross-relaxation between two ions of said dopant.

69. The optical material recited in claim 68, wherein said dopant is Er.

70. A highly doped bulk material laser comprising:
a low phonon energy bulk material having a dopant disposed therein, said dopant having a concentration greater than 5,000 ppm and no more than 500,000 ppm, said bulk material containing clusters of said dopant; said dopant being Er;
a resonant cavity, said resonant cavity being defined by a first and second reflective means at an amplification wavelength and disposed at two ends of said bulk material;
an energy source for injecting energy into said bulk material, wherein said bulk material contains clusters of said dopant and said clusters of said dopant enhance cross-relaxation between two elements of said dopant.

71. A highly doped bulk material amplifier comprising:
a low phonon energy bulk material having a dopant disposed therein, said dopant having a concentration of greater than 5,000 ppm and no greater than 500,000 ppm, said dopant being Er;
an energy source for injecting energy into said bulk material and thereby forming a highly doped bulk material amplifier, wherein said bulk material contains clusters of said dopant and said clusters of said dopant enhance cross-relaxation between two elements of said dopant.

72. A highly doped waveguide laser comprising:
a low phonon energy waveguide having a dopant disposed therein, said dopant having a concentration of between 1,001 and 500,000 ppm, said dopant being Er;
a resonant cavity, said resonant cavity being defined by a first and second reflective means at an amplification wavelength and disposed at opposite ends of said waveguide;
an energy source for injecting energy into said waveguide; and
wherein said waveguide contains clusters of said dopant, wherein at least 50% of said dopant is in said clusters, and wherein said clusters of said dopant enhance cross-relaxation between two elements of said dopant.

73. The waveguide laser recited in claim 72, further comprising sensitizer ions disposed in said waveguide for causing energy transfer between said dopant and said sensitizer ions; and
wherein said waveguide contains clusters of said dopant; and wherein said sensitizer ions assist in depopulation of the desired energy level of said dopant through energy transfer between said dopant and said sensitizer ions.

74. The waveguide laser recited in claim 73, wherein said sensitizer ions are at least one member selected from the group consisting of: ytterbium (Yb), praseodymium (Pr), thulium (Tm), terbium (Tb), europium (Eu), neodymium (Nd), samarium (Sm), erbium (Er), and mixtures thereof.

75. The waveguide laser recited in claim 72, wherein said waveguide is composed of at least one material selected from the group consisting of: GaN, ZnS, AlAs, GaAs, ZnSe, YLF, BaYF, $ZrF_4$, $HfF_4$, $BaF_2$, $SrF_2$, $LaF_3$, $YF_3$, $AlF_3$, KF, NaF, LiF, chalcogenides, tellurides, silicates, chelates, and mixtures thereof.

76. The waveguide laser recited in claim 75, wherein said waveguide comprises $ZrF_4$, $BaF_2$, $LaF_3$, and NaF.

77. A highly doped optical material comprising:
a low phonon energy bulk material having a dopant disposed therein, said dopant having a concentration of between 100 and 500,000 ppm, said bulk material containing clusters of said dopant, wherein at least 50% of said dopant is in said clusters and wherein said clusters enhance cross-relaxation between two ions of said dopant.

78. The optical material recited in claim 77, wherein said dopant is Er.

79. A highly doped bulk material laser comprising:
a low phonon energy bulk material having a dopant disposed therein, said dopant having a concentration of between 100 and 500,000 ppm, said bulk material containing clusters of said dopant; said dopant being Er;
a resonant cavity, said resonant cavity being defined by a first and second reflective means at an amplification wavelength and disposed at two ends of said bulk material;
an energy source for injecting energy into said bulk material, wherein said bulk material contains clusters of said dopant wherein at least 50% of said dopant is in said clusters, and wherein said clusters of said dopant enhance cross-relaxation between two elements of said dopant.

80. A highly doped bulk material amplifier comprising:
a low phonon energy bulk material having a dopant disposed therein, said dopant having a concentration of between 100 and 500,000 ppm, said dopant being Er;
an energy source for injecting energy into said bulk material and thereby forming a highly doped bulk material amplifier; wherein said bulk material contains clusters of said dopant wherein at least 50% of said dopant is in said clusters, and wherein said clusters of said dopant enhance cross-relaxation between two elements of said dopant.

* * * * *